United States Patent [19]

Newell

[11] 4,322,131

[45] Mar. 30, 1982

[54] IMAGE TRANSFER DEVICE USING MIRROR MOVING ON SPHERICAL FOCAL SURFACE

[75] Inventor: William H. Newell, Mount Vernon, N.Y.

[73] Assignee: The Perkin-Elmer Corporation, Norwalk, Conn.

[21] Appl. No.: 90,236

[22] Filed: Nov. 1, 1979

[51] Int. Cl.³ .............................................. G02B 7/18
[52] U.S. Cl. .................................... 350/289; 248/479
[58] Field of Search .................................... 350/48–50, 350/25, 26, 21, 22, 24, 285, 289, 288; 248/479, 486; 250/203 R

[56] References Cited

U.S. PATENT DOCUMENTS

| | | | |
|---|---|---|---|
| 3,629,592 | 12/1971 | Courrier | 350/22 |
| 3,632,868 | 1/1972 | Gaffard et al. | 350/285 |
| 3,752,998 | 8/1973 | Stripling et al. | 250/203 R |
| 3,942,879 | 3/1976 | Pledger | 350/285 |

Primary Examiner—Jon W. Henry
Attorney, Agent, or Firm—S. A. Giarratana; E. T. Grimes; T. P. Murphy

[57] ABSTRACT

An apparatus for transferring a portion of an image from the spherical focal surface of a telescope to a fixed viewing area. A spherical parallelogram type linkage has means for selectively positioning a mirror in the spherical focal surface of the telescope and constrains the mirror to move within the contour of the spherical focal surface of the telescope. The parallelogram type linkage includes means for transferring the image reflected by the mirror to a remote viewing area.

13 Claims, 2 Drawing Figures

IMAGE TRANSFER DEVICE USING MIRROR MOVING ON SPHERICAL FOCAL SURFACE

BACKGROUND OF THE INVENTION

Transfer of one or more minute portions of the image seen by a large telescope to a remotely located and separate fixed piece of optical equipment for detailed analysis or reproduction is often desirable. For example, stars or satellites which form only a small part of the image appearing in the focal surface of a large scale telescope require isolated viewing for purposes of reproduction or detailed scientific study. To accomplish the transfer of selected portions of images from the focal surface of a telescope to remote fixed viewing areas is especially difficult since the objects to be viewed are often moving relative to the field of view of a telescope. This difficulty is compounded even more since the focal surface of large telescopes is spherical or nearly spherical in shape.

Other than his invention Applicant is aware of one other method of transferring images from the focal surface of a telescope to a fixed viewing area. This method entails a mirror for each quadrant of the focal surface. The mirrors cover the entire surface of their individual quadrants. These mirrors are used to reflect the image to a detector off to the side of the telescope. This method encounrters problems of selection of the area to be viewed, aiming the mirrors in addition to maintaining proper distances to the detector for adequate focusing. This last problem arises because each point on the mirror is at a different reflecting distance from the detector and correcting mechanisms for this problem are extremely complicated.

The present invention provides a system which overcomes the foregoing mentioned problems.

SUMMARY OF THE INVENTION

The present invention relates to system for transferring a selected portion of the image viewed by a telescope to a remote fixed viewing area by means of a small pick up mirror disposed in the spherical focal surface of the telescope. A spherical parallelogram type linkage having one axis fixed to the body of the telescope is constructed so that its four pivots point along lines which converge at the center of the exit pupil of the telescope. An extension of one of the links of the parallelogram type linkage has a small mirror attached to the end thereof. Motion of one of the links while an adjacent link is held stationary causes the pick up mirror to move in a first direction while motion of an adjacent link while the said one link is held stationary causes the pick up mirror to travel in a second direction approximately perpendicular to said first direction. Due to the configuration of the parallelogram type linkage the pick up mirror is constrained to follow the contour of the spherical focal surface.

The parallelogram type linkage has an optical system disposed therein including collimating means which is continuously maintained at a fixed distance from the pick up mirror equal to the focal length of the collimating means. The collimated rays of the picked up image are transferred via a series of optical devices to a viewing area remote of the parallelogram type linkage where the image may be refocused for viewing or analysis.

DESCRIPTION

Figure 1:
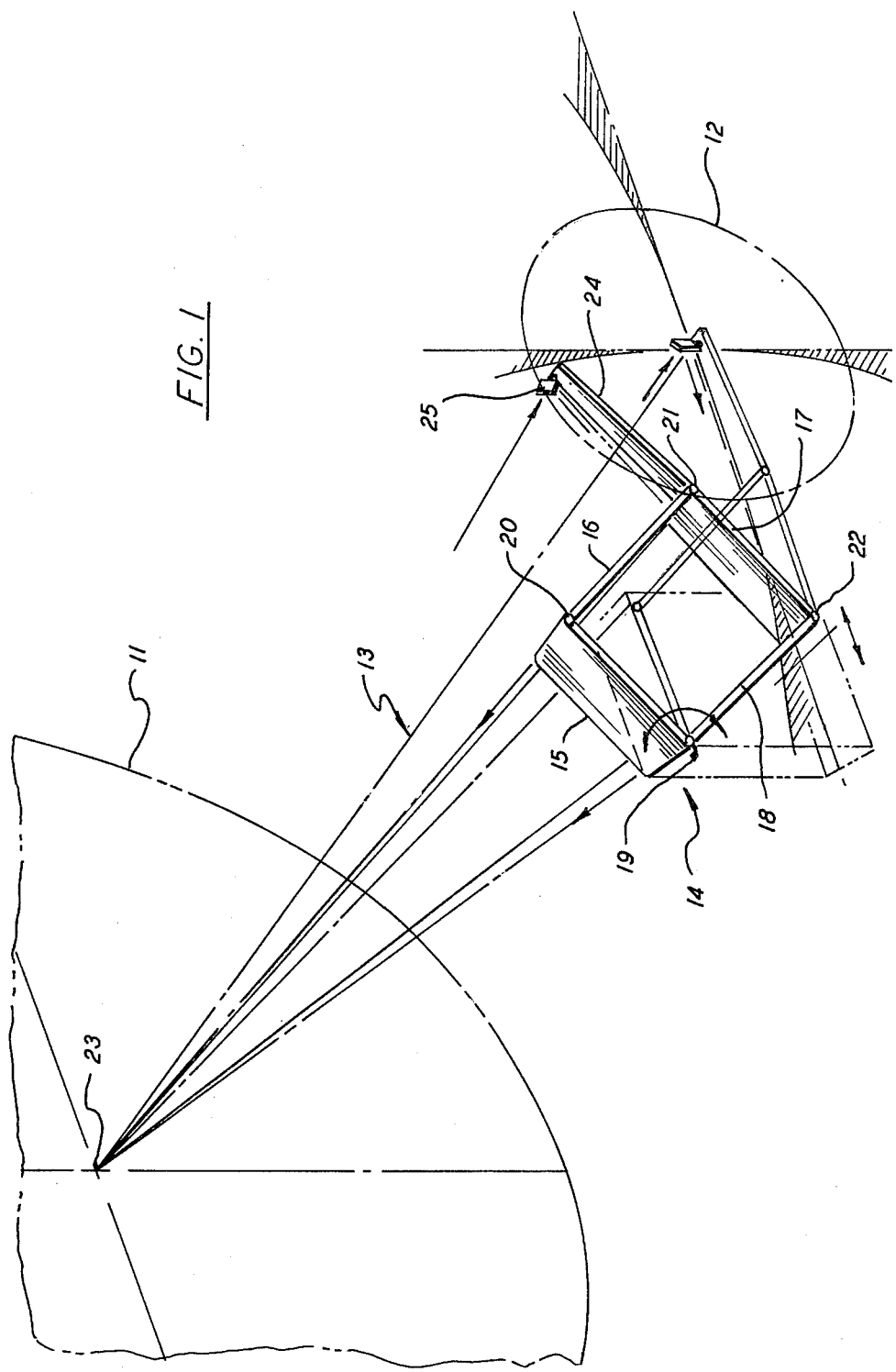
FIG. 1 is a schematic representation of the geometrical relationship between a telescope and the image pick up mechanism of the present invention.

Referring now more particularly to FIG. 1 there is shown an exit pupil 11 of a telescope, For purposes of definition an exit pupil of a telescope is that portion of a telescope from which all light appears to emanate. It is not necessarily the exit or entrance lens of the telescope but may be any portion within the telescope as defined by stops or optical elements which define the field of view for the telescope.

A focal surface 12 is disposed form the exit pupil 11 at a distance dependent on the size of the telescope and focal length of the lens or optical system of the telescope. The focal surface is that portion of the telescope in which the field of view as seen by the telescope is imaged. The focal surface is not necessarily a physical element of the telescope but may be any portion therein wherein the field of view is focused such that the image focused thereat is viewable by appropriate optical means.

The exit pupil 11 and focal surface 12 of a telescope are intrinsically related in that their centers fall along a straight line such as line 13 representative of the axis of the telescope to which the plane of the exit pupil and a plane tangent to the focal surface are perpendicular at their point of intersection with the line.

The focal surface of any telescope is substantially a portion of a sphere. The telescope designed for use with the present invention has a focal surface which is a portion of an exact sphere and hence hereinafter referred to as a spherical focal surface.

As is more fully explained herein below a parallelogram type linkage 14 comprising four basic links 15, 16, 17 and 18 each relatively movable with respect to the other by means of pivots 19, 20, 21 and 22 is fixed to the body of the telescope at pivot point 19.

The parallelogram type linkage 14 is so configured that axial lines drawn from the pivots 19, 20, 21 and 22 converge to the center 23 of the exit pupil 11. To avoid cluttering the drawing only those lines emanating from the pivot points 19, 20, 21 and 22 associated with the unshaded position of the parallelogram type linkage 14 are shown. It should be understood however, that regardless of the position of the parallelogram type linkage the pivots 19, 20, 21 and 22 always point to the center 23 of the exit pupil. Link 17 has an extension 24 to the end of which is attached a mirror 25 disposed at a 45° angle to the principal ray of the telescope through the center of the mirror. As will be more clearly seen hereinbelow the length of extension 24 is critical.

Due to the configuration of the parallelogram type linkage 14 the mirror 24 may be caused to move in either one of two different directions which are approximately perpendicular to each other and is constrained to follow the contour of the spherical focus focal surface 12. By preventing movement of one of the links 15 or 18 and causing the other three links to move, the mirror 25 is moved in one direction. Preventing movement of the adjacent 15 or 18 link and permitting the other three links to move, the mirror 25 is moved in a direction approximately perpendicular to the first direction.

Figure 2:
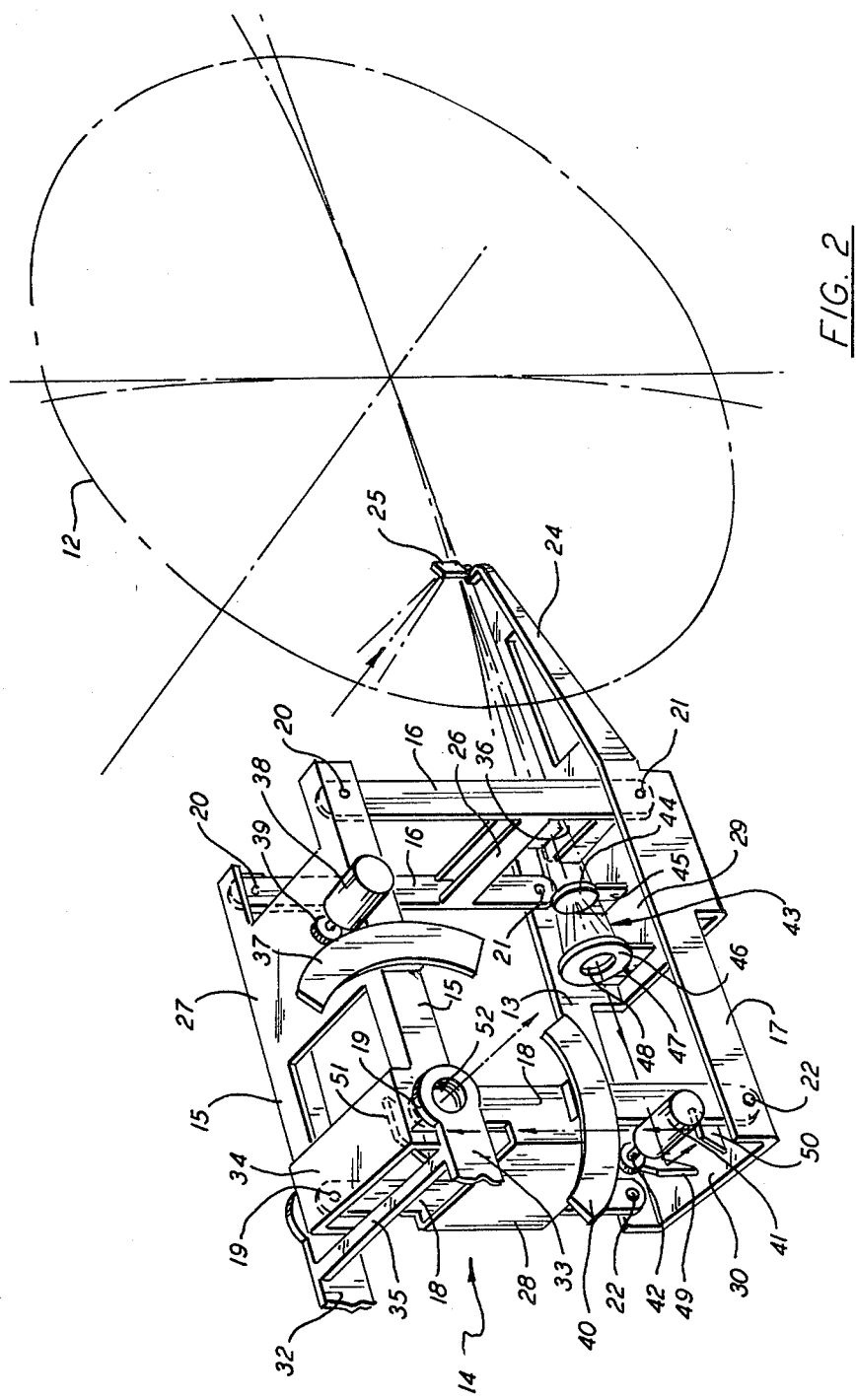
FIG. 2 is a pictorial representation of the image transfer apparatus of the present invention in association with the focal surface of the present invention.

FIG. 2 illustrates a preferred embodiment of the present invention. Insofar as it is similar to the parallelogram depicted in FIG. 1, like reference numerals indicate like parts. FIG. 2, however, illustrates a parallelogram type linkage wherein each link comprises two side pieces having the same reference number. For example, one side of the parallelogram comprises side pieces 16 formed integrally with supporting cross piece 26. Similarly, side pieces 15 are supported by integral cross piece 27. Side pieces 18 are supported by cross piece 28 while side pieces 17 are supported and separated by cross piece 29. Side pieces 17 also have an additional cross piece 30.

As seen in FIG. 2, the pivots 19, 20, 21 and 22 are connected to their respective links such that each link 16, 17, 18 and 15 is free to move relative to each other. Pivot point 19 of the parallelogram type linkage 14 is fixed to the frame of the telescope via extensions 32 and 33 which are fixed to pivots 19 allowing rotation of cross piece 34 which is integrally connected between side pieces 15 and rotation of link 18. The extensions 32 and 33 may be further supported by cross piece 35.

What has just beeen described is a parallelogram type linkage having freedom of movement about all four of its pivots but which is fixed at one of its pivots to the frame of the telescope. While the links 15, 16, 17 and 18 may be equal in angular length, it is ony necessary that opposite links have equal angular length about the center of the exit pupil. The cross pieces 26, 27, 28, 29 and 30 provide stiffness for the parallelogram type linkage 14.

As more clearly seen in FIG. 1, axial straight lines drawn from the pivots 19, 20, 21 and 22 converge at a single point at the center 23 of the exit pupil 11.

This may be accomplished in several ways, one of which is by appropriately bending or casting in bent form the entire links themselves. Another method is to bend only that portion of the pivot area necessary to accomplish the machining of the convergent arrangement. In any event, the bend is so slight as to be almost indiscernible in the drawing.

The extension 24 which extends from link 17 is further stiffened in the parallelogram type linkage 14 by cross piece 36 between side pieces 17. The mirror 25 is so positioned by the extension 24 so as to be exactly centered on the optic axis traversing the parallelogram as discussed hereinbelow.

Link 15 has an arcuate gear segment 37 fixed thereto as by welding approximately midway between the ends of the link 15.

A motor and encoder or resolver 38 fixed by appropriate means to the frame of the telescope has a gear 39 disposed on its shaft in operative relationship with the arcuate gear segment 37.

Link 18 has an arcuate gear segment 40 fixed thereto as by welding approximated midway between the ends of the link 18.

A motor and encoder or resolver 41 fixed by appropriate means to the frame of the telescope has a gear 42 disposed on its shaft in operative relationship with the arcuate gear segment 40.

The optical arrangement for transferring the image picked up by mirror 25 is described hereinbelow. An opitcal collimating lens arrangement 43 is located on the optic axis in link 17. The distance between the mirror 25 to the collimating optics 43 is fixed by extension 24 to always be equal to the focal length of the collimating optics 43.

The collimating optics 43 comprises a mirror 44 supported fixed to strut 45 which is in turn fixed to the cross piece 29. The collimating optics further comprises an annular type mirror 46 fixed to strut 47 which itself is fixed to the cross piece 29. The reflecting surfaces of mirrors 44 and 47 face each other such that light from mirror 25 is first reflected from the mirror 47 to mirror 44 and emerges as collimated light through the aperture 48 of the mirror 47. This type of collimation is well known in the art.

A fold mirror 49 centrally located on the optic axis in link 17 and disposed at a 45° angle and fixed to cross piece 30 is positioned to receive the collimated light and transfer it along axis 22 to fold mirror 50 disposed at a 45° angle and also fixed to side piece 18 in such a way as to transfer the collimated light to another fold mirror 51 fixed to side piece 18 and disposed at a 45° angle for receiving the light from fold mirror 50 and transferring it out through aperture 52 along axis 19 to a viewing area where the image received from 25 may be refocused for analysis or reproduction.

It should be noted tha the fold mirrors 49, 50 and 51 are all located along the axes of pivots 19 or 22 so that there is no relative movement of the optic axis traversing the parallelogram type structure 14.

Due to the nature of support and structural arrangement of the parallelogram 14, any point on any one of the links is constrained to move in a spherical surface centered on the center of the exit pupil 11.

Due to the constraints mentioned, pick up mirror 25 always moves in the focal surface of the telescope. The principal ray to any selective point of the focal surface 12 is directed toward the center of the collimating mirrors 44 and 46 such that the bundle of rays from the exit pupil surrounding the principal ray is collimated and directed from fold mirror to fold mirror along the axis of the links as discussed. When link 18 is held stationary, that is, when motor 50 is stationary and motor 38 is energized to cooperate with gear segment 37, links 15, 16 and 17 move about their pivots to cause pick up mirror 25 to move up and down in FIG. 2. On the other hand, when link 15 is held stationary by motor 38 being stationary and motor 50 is energized to cooperate with gear segment 40, links 16, 17 and 18 are caused to move about their respective pivots causing the mirror 25 to move inwardly or outwardly from the center of the spherical focal surface 12. As aforesaid, these movements of mirror 25 are forced to follow the contour of the spherical shape of spherical focal surface 12. At the same time because the distance between mirror 25 and the collimating optics 43 is constant, the image transferred by the mirror 25 to the collimating optics is sharp since the mirror 25 is at the focal point of the collimating optics 43. Once the bundle of light rays is collimated they may be transferred back and forth through an indefinite path length prior to transferring through aperture 52 to a viewing area.

Mirror 25 can thus be used to view small segments of the focal surface which may be located over a wide range of the focal surface and to follow moving images such as stars which might appear in a tracking telescope. Becaue of the small size of arm 24 and mirror 25 of the parallelogram type linkage 14, duplicates of the invention may be used to transfer separate small segments of the focal surface simultaneously with little obscuration of the main image or interference between the duplicates.

As shown, position encoders are associated with motors 38 and 50, which may be used in conjunction with a computer for locating and tracking precise objects which appear in the focal surface 12 and may be further used to lock on to the objects being tracked.

In view of the foregoing description, other modifications of the present invention are possible, and no limitations should be placed on the present invention other than those set forth in the claims which follow:

What is claimed is:

1. An apparatus for transferring a portion of an image seen by a telescope having an exit pupil and a spherical focal surface whose centers lie along the principle axis of the telescope, comprising in combination;
    a pick-off mirror disposed in the spherical focal surface of the telescope,
    first means connected to said mirror for moving said mirror and constraining the movement of said mirror to within the spherical focal surface,
    second means for transferring the image reflected by said mirror to a remote viewing area.

2. An apparatus according to claim 1 wherein said first means comprises,
    a linkage comprising four links arranged in a parallelogram,
    pivot means connecting the ends of adjacent ones of said links, respectively.

3. An apparatus according to claim 2 wherein, said pivot means comprises four pivot members forming axes about which adjacent links are free to rotate, respectfully.

4. An apparatus according to claim 3 wherein, said links are arranged so that all of said axes extend through the center of the exit pupil of the telescope.

5. An apparatus according to claim 4 wherein, one of said pivot members connecting the ends of two adjacent links is fixedly mounted with respect to the telescope.

6. An apparatus according to claim 5 wherein said second means comprises,
    light collimating means fixed to said linkage for collimating light received from said mirror.

7. An apparatus according to claim 6 wherein, said pick-off mirror is fixed to the end of an extension of one of said links at a distance equal to the focal length of said light collimating means.

8. An apparatus according to claim 7 wherein said second means further comprises,
    fold mirror means fixed to said linkage for transferring collimated light from said light collimating means to a remote viewing area.

9. An apparatus according to claim 8 wherein said fold mirror means comprises,
    first, second and third mirrors,
    said first mirror disposed to reflect light from said light collimating means, and
    said second mirror disposed to reflect light from said first mirror,
    said third mirror disposed to reflect light from said second mirror and transfer it away from said linkage.

10. An apparatus according to claim 9 wherein, said first and second mirrors are disposed along the axis of one of said pivot members, and
    said third mirror is disposed on the axis of said fixed pivot member.

11. An apparatus according to claim 10 wherein,
    said pick-off mirror is disposed at a 45° angle with respect to the principal ray of the telescope at the mirror, and
    said first, second and third mirrors are disposed at 45° angles with respect to said pivots.

12. An apparatus according to claim 10 further comprising,
    motive means connected to first and second ones of said links,
    said first and second ones of said links having adjacent ends common to said fixed pivot member.

13. An apparatus according to claim 12 wherein said motive means comprises,
    first motor means connected to said first one of said links, and
    second motor means connected to said second one of said links,
    whereby driving one or both of said motors causes said pick-off mirror to move within said spherical focal surface in a direction defined by the relative motions of said first and second motor means.

* * * * *

UNITED STATES PATENT AND TRADEMARK OFFICE
CERTIFICATE OF CORRECTION

PATENT NO. : 4,322,131
DATED : March 30, 1982
INVENTOR(S) : William H. Newell

It is certified that error appears in the above-identified patent and that said Letters Patent are hereby corrected as shown below:

Column 1, line 29, change "encounrters" to --encounters--,

Column 2, line 19, change "form" to --from--,

Column 3, line 25, change "beeen" to --been--,

Column 3, line 66, change "opitcal" to --optical--,

Column 4, line 25, change "tha" to --that--,

Column 4, line 65, change "Becaue" to --Because--.

Column 2, line 12, change "," to -- . --.

Signed and Sealed this

Twenth-eighth Day of September 1982

[SEAL]

Attest:

GERALD J. MOSSINGHOFF

Attesting Officer     Commissioner of Patents and Trademarks